(12) United States Patent
Miyazawa (10) Patent No.: US 8,801,554 B2
(45) Date of Patent: Aug. 12, 2014

(54) POWER TRANSMISSION CHAIN

(75) Inventor: Toshihiko Miyazawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 126 days.

(21) Appl. No.: 13/478,270

(22) Filed: May 23, 2012

(65) Prior Publication Data

US 2012/0316020 A1     Dec. 13, 2012

(30) Foreign Application Priority Data

Jun. 10, 2011   (JP) ................................. 2011-130180

(51) Int. Cl.
   *F16G 13/07*   (2006.01)
   *F16G 13/06*   (2006.01)

(52) U.S. Cl.
   CPC ..................... *F16G 13/06* (2013.01)
   USPC ....................................................... 474/230

(58) Field of Classification Search
   USPC ............................................ 474/91, 140, 230
   See application file for complete search history.

(56) References Cited

U.S. PATENT DOCUMENTS

| | | | | |
|---|---|---|---|---|
| 2,568,649 A * | 9/1951 | McIntosh et al. | ............. | 474/231 |
| 3,074,290 A * | 1/1963 | Eastep | ........................... | 474/231 |
| 4,117,738 A * | 10/1978 | McKeon | ........................ | 474/228 |
| 5,192,252 A * | 3/1993 | Skurka et al. | .................. | 474/210 |
| 5,562,558 A * | 10/1996 | Kubota | .......................... | 474/209 |
| 7,108,622 B2 * | 9/2006 | Okabe | ............................ | 474/156 |
| 7,419,449 B2 * | 9/2008 | Tohara et al. | .................. | 474/213 |
| 8,469,845 B2 * | 6/2013 | Miyazawa et al. | ............. | 474/206 |
| 2007/0082776 A1* | 4/2007 | Nagao | ............................ | 474/230 |
| 2007/0254759 A1* | 11/2007 | Tamiya | .......................... | 474/230 |
| 2008/0020882 A1* | 1/2008 | Tohara et al. | .................. | 474/212 |
| 2010/0093475 A1* | 4/2010 | Miyazawa | ...................... | 474/231 |
| 2010/0267504 A1 | 10/2010 | Miyazawa et al. | | |
| 2013/0053194 A1* | 2/2013 | Yokoyama | ...................... | 474/91 |

OTHER PUBLICATIONS

Unpublished U.S. Appl. No. 13/559,773 for Chain Transmission Apparatus.

* cited by examiner

*Primary Examiner* — William A Rivera
*Assistant Examiner* — Michael Riegelman
(74) *Attorney, Agent, or Firm* — Howson & Howson LLP (57) ABSTRACT

In a roller or bushing chain, inner link plats have an oval shape, with a guide-contacting surface continuous with arc-shaped ends, and in the form of an arc having end points that are spaced from each other by a distance greater than the chain pitch but less than the greatest distance between parts of bushing holes in the inner link plates. The outer link plates have straight parallel edges parallel to the direction of chain elongation and semicircular ends continuous with the straight edges. The configuration of the inner link plates prevents the outer link plates from coming into contact with a chain guide.

5 Claims, 9 Drawing Sheets

POWER TRANSMISSION CHAIN

CROSS REFERENCE TO RELATED APPLICATIONS

This application claims priority on the basis of Japanese patent application No. 2011-130180, filed on Jun. 10, 2011. The disclosure of Japanese patent application 2011-130180 is here incorporated by reference.

FIELD OF THE INVENTION

The invention relates to a power transmission chain such as a roller chain or a bushing chain for use in power transmission mechanisms of automobiles or industrial machinery.

BACKGROUND OF THE INVENTION

A conventional roller or bushing chain comprises alternating pairs of laterally spaced inner link plates and laterally spaced outer link plates. The inner link plates are connected by cylindrical bushings the ends of which are press-fit into the link plates, and the outer link plates are connected by connecting pins that are press fit into the outer link plates. The outer link plates are disposed in overlapping relationship with the inner link plates, and the connecting pins extend rotatably through the bushings. In the case of a roller chain, the bushings are surrounded by rollers.

Both the outer link plates and the inner link plates of the conventional chain typically have an oval shape. The distance from the pitch line, i.e. a line extending in the direction of elongation of the chain through the centers of the connecting pins, to the edges of the respective link plates is referred to as the "back height."

If the back height of the outer link plate is equal to the back height of the inner link plate, and both plates are in sliding contact with a chain guide, the area of contact between the chain and the guide becomes large, and consequently a significant amount of power is lost on account of excessive friction. In the case of an engine timing chain, for example, excessive friction can reduce the engine's fuel efficiency.

To address the above problems, a chain disclosed in United States patent application publication No. 2010/0267504, published Oct. 21, 2010 is composed of oval inner link plates that do not contact a guide, and outer link plates having bulging ends that slide on the surface of the guide. However, because the bulged ends of the chain are shorter than the chain pitch, a straight area of an inner link plate, parallel to the direction of elongation of the chain, comes into contact with the guide surface before an adjacent outer link plate when the link plates bend about a connecting pin. Consequently, the contact area is not reduced.

In the conventional roller chain, the thickness of the outer link plate is equal to the thickness of the inner link plate. Consequently, the rigidity of the inner link plates is lower than rigidity of the outer link plates. Therefore, the outer link plates can become deformed when tension is applied to the chain. As a result, the connecting pins and the bushings are subject to wear due to localized contact, and bending of the connecting pins can result in breakage.

Another problem is that, in the conventional chain, the outer link plate can ride on a curved corner of the chain guide where the chain-engaging surface meets a chain-restraining side wall formed on the guide. When the chain rides on the curved corner of the chain guide the chain can travel in an unstable inclined condition.

Accordingly, there is a need for a power transmission chain that addresses the aforementioned problems, by reducing the contact area between the chain and the chain guide, by increasing the flow of lubricating oil to the area where the chain contacts the chain guide, thereby reducing frictional losses, by assuring stable chain travel, by preventing breakage of the connecting pins, and by suppressing wear of the chain guide.

SUMMARY OF THE INVENTION

The chain according to the invention is a roller chain or bushing chain comprising pairs of laterally spaced inner link plates, and pairs of laterally spaced outer link plates. The ends of cylindrical bushings are press-fit into bushing holes in the inner link plates, and connecting pins are press-fit into pin holes in the outer link plates. The pairs of outer link plates are disposed in alternating, overlapping relationship with the pairs of inner link plates along the length of the chain, and each connecting pin of a pair of outer link plates extends rotatably through a bushing of an overlapping pair of inner link plates so that the pairs of link plates are articulably connected. Each inner link plate has an oval profile, including an arc-shaped edge for sliding contact with the surface of a chain guide. The arc shaped edge has opposite ends spaced from each other along a direction parallel to the longitudinal direction of the chain, and the distance from one of the opposite ends of the arc-shaped edge to the other end thereof is greater than the pitch of the chain but less than the diameter of an imaginary circle circumscribing, and tangent to, both of the bushing holes of the inner link plate and centered on a center line intersecting the centers of the bushing holes.

If the distance between the end points of the arc-shaped edge of the inner link plate were less than the chain pitch, the outer link plate could contact the chain guide. However, lengthening of the arc-shaped edge prevents such contact Even if the sliding contact surface of the guide is curved, the front or rear end of an arc-shaped edge of the inner link plate contacts the guide surface before it is contacted by the preceding outer link plate and prevents the outer link plate from contacting the chain guide. Accordingly, it is possible to reduce frictional resistance by reducing the total area of contact between the chain and the guide. It also becomes easier for lubricating oil to reach the area of contact between the inner link plates and the chain guide through the gap formed between the outer link plate and the chain guide, and thereby improve power transmission efficiency by reducing frictional losses.

If distance between the end points of the arc-shaped edge of the inner link plate were longer than the distance between the most widely spaced points on the respective bushing holes of the inner link plate, the inner link plate would block flow of lubricating oil to the side of the inner link plate through the gap between the outer link plate and the chain guide. Another result would be the impairment of the balance of strength of the inner link plate and the outer link plate. However, by spacing the end points of the arc-shaped guide-contacting edge of the inner link plate from each other by a distance not exceeding the distance between the most widely spaced points on the respective bushing holes, flow of lubricating is assured, and the strength of the inner and outer link plates can be balanced.

Because the distance between the end points of the arc-shaped sliding-contact edge of the inner link plates is greater than the chain pitch, it is possible to avoid the impairment of fatigue strength that would otherwise be caused by a step-like cut-away shape and that would occur at the junction of the straight semi-circular arc-shaped parts of the outer link plate.

In accordance with another aspect of the invention, each of the outer link plates can have an oval profile and an edge composed of straight parts on opposite sides of, and parallel to, a centerline intersecting the centers of the pin holes. Each of these straight parts has a first end opposed to a first end of the other straight part and a second end opposed to a second end of the other straight part, a first curved connecting part continuous with the straight parts and connecting the first ends and a second curved connecting part continuous with the straight part and connecting the second ends. The back height of the outer link plate is less than the back height of the inner link plate so that only the inner link plate can come into sliding contact with a chain guide.

Here, the rigidity of the outer link plate can be lower than the rigidity of the inner link plate, so that the outer link plate is elastically deformed when tension is exerted on inner link plates. Accordingly, it is possible to suppress bending and resulting breakage of the connecting pins.

When the back height of the sliding contact edge of the outer link plate is less than the back height of the sliding contact edge of the inner link plate and only the inner link plate is in sliding contact with the guide, it is also possible to ensure stable chain travel by avoiding the inclined condition of the chain caused by riding of the outer link plates on curved corners of the chain guide, and to suppress wear of the chain guide resulting from concentrated local of the chain with the outer edges of the outer link plates.

In accordance with still another aspect of the invention, the thickness of the outer link plate can be less than the thickness of the inner link plate, while the cross-sectional area of each section of the outer link plate, in a plane perpendicular to the longitudinal direction of the chain and in which the axis of one of the connecting pins lies, is greater than the cross-sectional area of each section of the inner link plate, in a plane perpendicular to the longitudinal direction of the chain and in which the axis of one of the bushings lies.

The reduced thickness of the outer link plate and the resulting reduction in its rigidity enable the outer link plate to deform elastically in response to tension exerted on the inner link plates and maintains parallelism of the outer link plates with the inner link plates. Here again, because the rigidity of the outer link plate is lower than the rigidity of the inner link plate, the outer link plate can be elastically deformed when tension is exerted on inner link plates, and bending and resulting breakage of the connecting pins can be suppressed.

At the same time, because the cross-sectional area of each section of the outer link plate, in a plane perpendicular to the longitudinal direction of the chain and in which the axis of one of the connecting pins lies, is greater than the corresponding cross-sectional area of each section of the inner link plate, the rupture strength of the outer link plates is greater than the rupture strength of the inner link plates. Accordingly, it is possible to maintain the rupture strength of the chain even if the rigidity of the outer links plate is reduced.

In accordance with still another aspect of the invention, the height of each inner link plate is less than the chain pitch. Accordingly, the chain can be compatible with, and can replace conventional transmission chains in which the height of the outer link plates is less than the chain pitch.

DESCRIPTION OF THE EMBODIMENT

Figure 1:
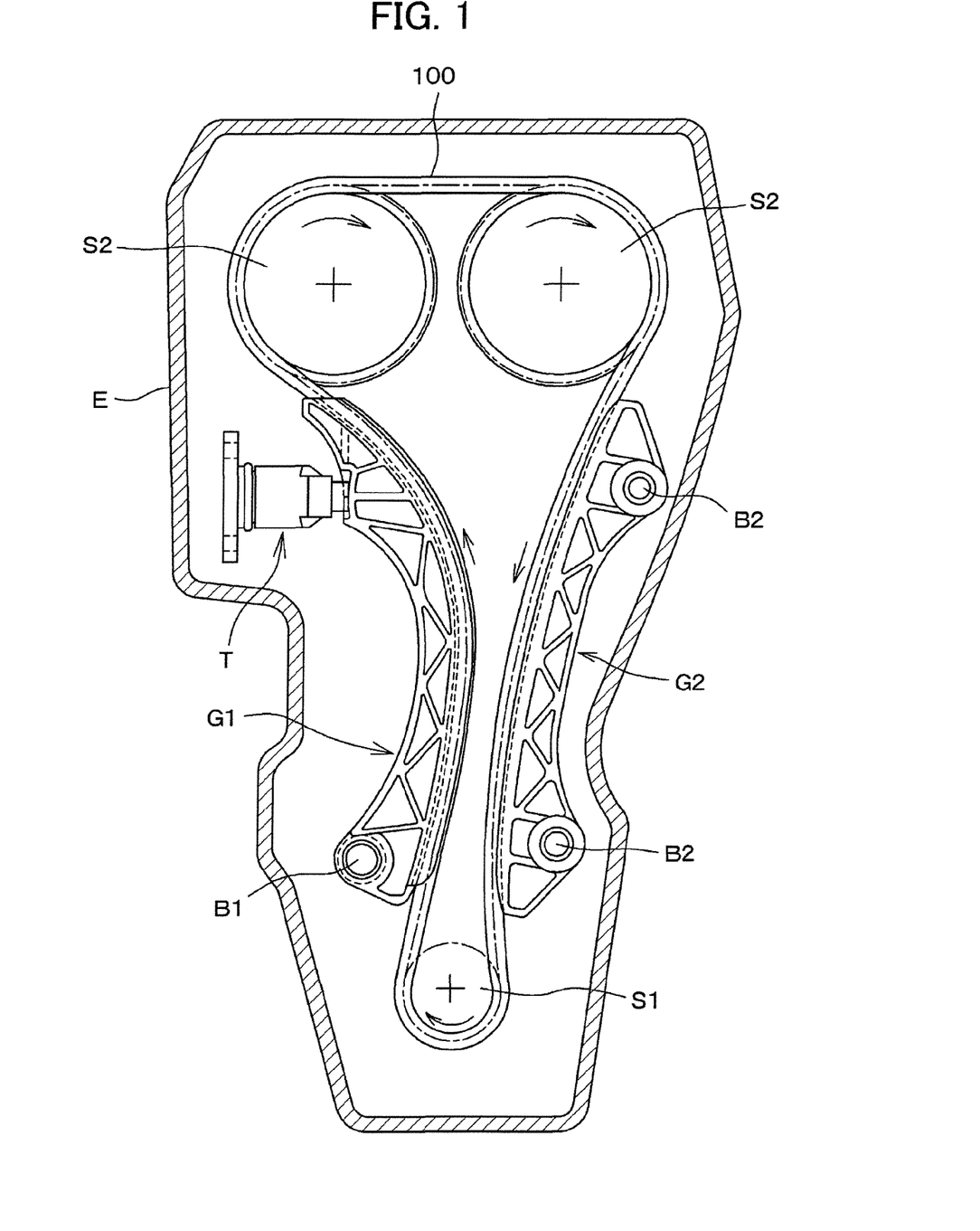
FIG. 1 is a schematic front elevational view of an engine timing drive incorporating chain according to the invention.

As shown in FIG. 1, a chain 100 is used in the timing drive of an engine E to transmit power from a crankshaft sprocket S1 to a pair of camshaft sprockets S2. The chain is in sliding contact with a tensioner lever G1 pivoted on bolt B1, and a fixed guide G2 mounted on bolts B2. A tensioner T maintains tension in the span of the chain that travels from sprocket S1 toward one of sprockets S2 by pressing against lever G1.

Figure 2:
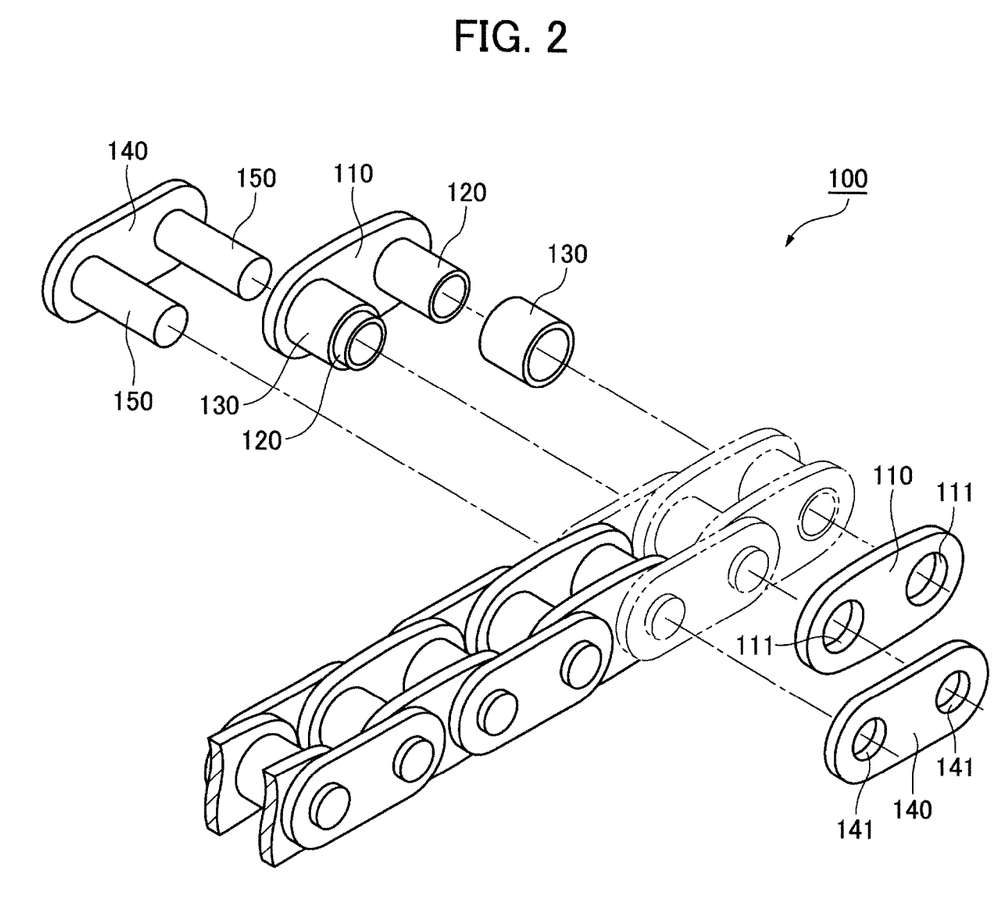
FIG. 2 is an exploded view of a chain according to the invention.
Figure 3:
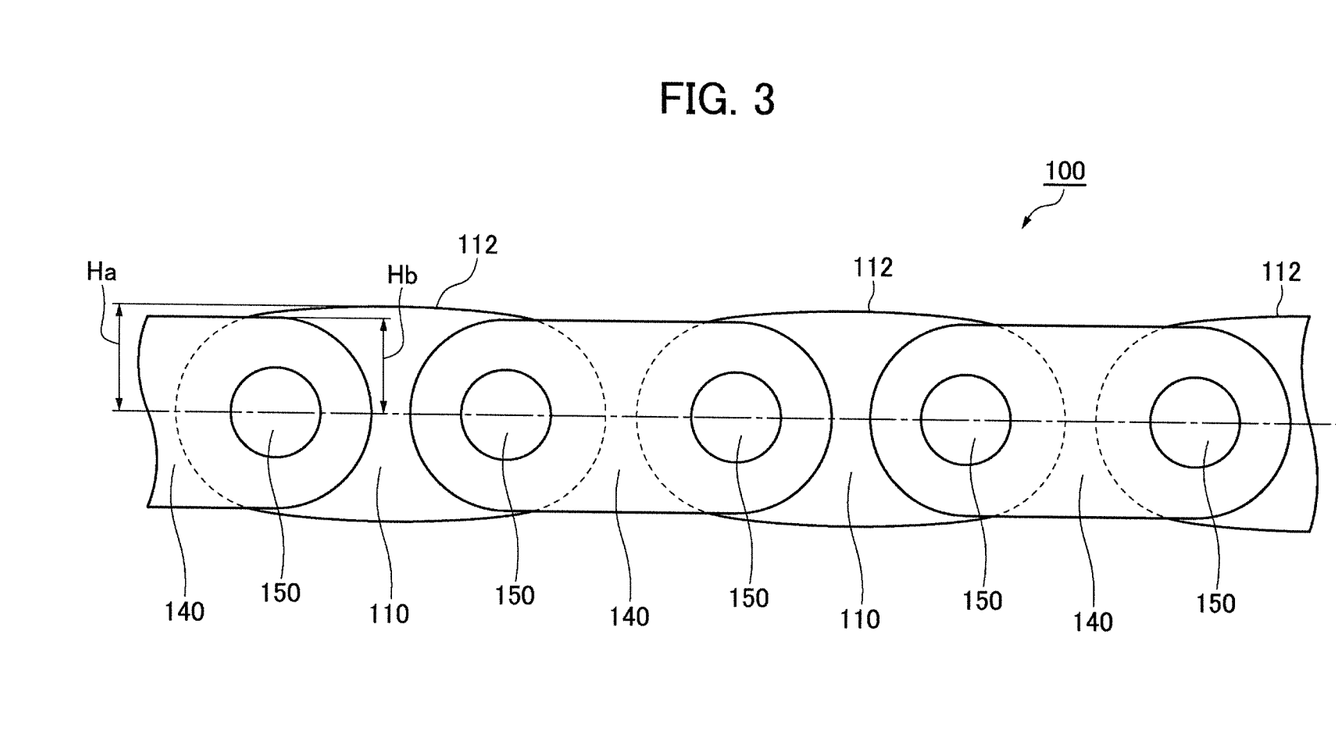
FIG. 3 is a side elevational view of a part of a chain according to the invention.

As shown in FIG. 2, the chain 100 comprises pairs of laterally spaced inner link plates 110 in side-by-side relationship. Opposite ends of cylindrical bushings 120 are press-fit into bushing holes 111 in the inner link plates. Rollers 130 fit rotatably around the bushings 120. The chain also includes pairs of laterally spaced outer link plates 140 also in side-by-side relationship and disposed in overlapping relationship with the inner link plates 110 on the outsides thereof. Connecting pins 150 are press-fit into pin holes 141 of the outer link plates 140, and extend rotatably through the bushings 120. An endless roller chain is constructed by connecting pairs of inner and outer link plates in alternating relationship. As shown in FIG. 3, the plates are symmetrical with respect to a longitudinal centerline extending through the centers of the connecting pins (which coincide with the centers of the bushings). The inner link plates 110 have arc-shaped edges 112 and have a back height Ha, measured from the longitudinal centerline to the part of the arc-shaped edges farthest from the centerline. The outer link plates 140 have a straight back edges parallel to the centerline and a back height Hb measured from the centerline to the back edges.

Figure 4:
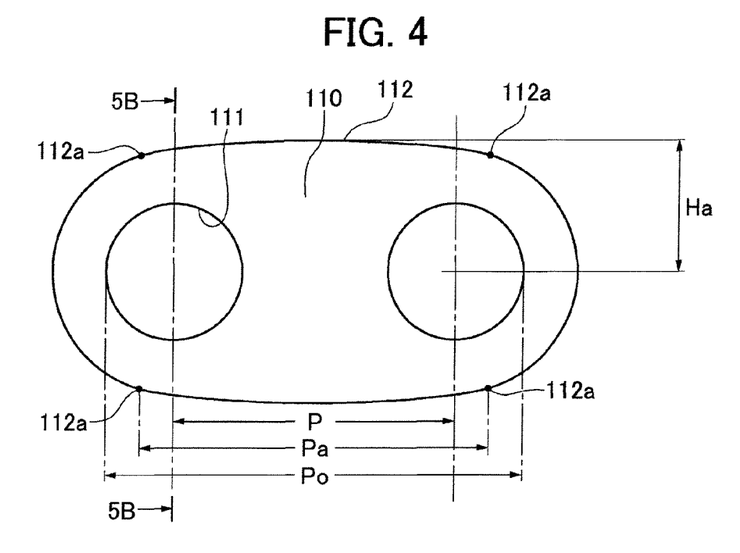
FIG. 4 is a side elevational view of an inner link plate of a chain according to the invention.
Figure 5A:
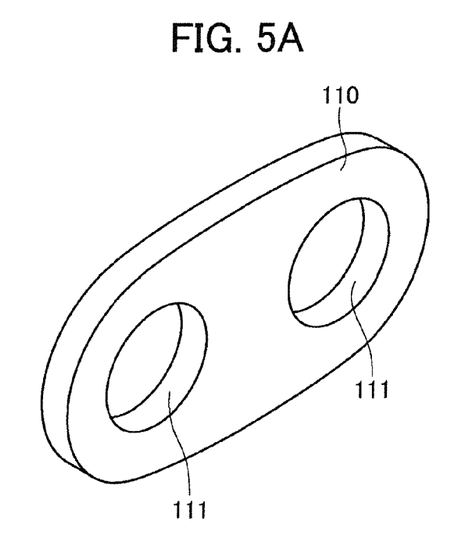
FIG. 5A is a perspective view of the inner link plate.
Figure 5B:
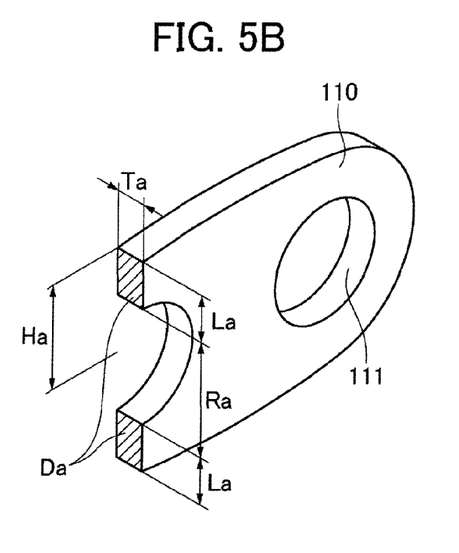
FIG. 5B is a perspective of the inner link plate when cut by section plane 5B-5B in FIG. 4.

As shown in FIGS. 4, 5A and 5B, each inner link plate 110 has an oval profile with an arc-shaped edge 112 for sliding contact with the sliding contact surface of a chain guide. Although, to facilitate assembly, the plate 110 is desirably symmetrical with respect to a centerline intersecting the centers of its bushing holes 111, only the edge 112 that comes into sliding contact with the guide needs to have the arcuate shape. The opposite edge can have a different shape. The distance Pa from the end points 112a of the arc-shaped edge 112 is greater than the chain pitch P (the distance between the centers of the bushing holes), but shorter than the distance Po between the parts of the respective bushing holes that are most remote from each other. Po is the diameter of an imaginary circle circumscribing, and tangent to, both of the bushing and centered on a center line intersecting the centers of the bushing holes. The end points 112a are the points at which the arcuate guide-contacting portion of the edge of the inner link plate meets the arc-shaped end regions of the link plate that are centered on the centers of the bushing holes of the inner link plate.

In the chain, the curvatures of the ends of the inner link plates are the same as the curvatures of the ends of the outer link plates. That is, the ends of the outer link plates are in the form of semi-circular arcs which are continuous with the straight backs of the outer link plates. On the other hand, the ends of the inner link plates are in the form of circular arcs that subtend an angle less than 180 degrees and are continuous with the arc-shaped back edges of the inner link plates. Even if the surface of the chain guide on which the chain slides is curved, the fact that the arc-shaped edge of the inner plate extends in both directions beyond the centers of the bushing holes prevents the outer link plates from contacting the chain guide.

Furthermore only a small part of the arc-shaped edge 112 of the inner link plate 110 comes into sliding contact with the guide, and the end portions of the edge 112 come into very light contact with guide, a contact condition referred to as a "zero touch state."

Figure 6:
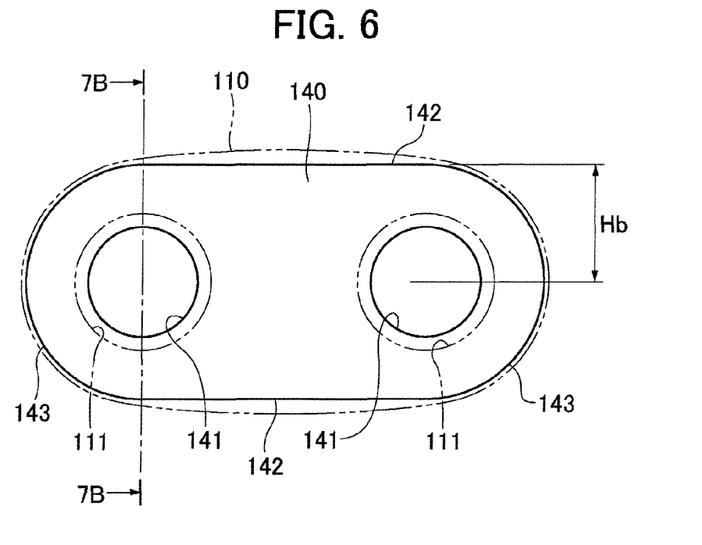
FIG. 6 is a side elevational view of an outer link plate of a chain according to the invention, showing in a broken line, the relationship between the outer link plate and an inner link plate.

As shown in FIG. 6, the outer link plate 140 has an oval profile composed of straight edges 142, parallel to the longitudinal direction of the chain, and a semi-circular arc-shaped ends 143 continuous with the straight edges 142. A broken line indicates the shape of the inner link plate 110 in order to compare the shapes of the inner and outer link plates. Because the back height Hb of the outer link plate 140 is less than the back height Ha of the inner link plate 110, as shown in FIG. 3, only the inner link plate 110 comes into sliding contact with the chain guide even if the chain guide surface is curved.

Figure 7A:
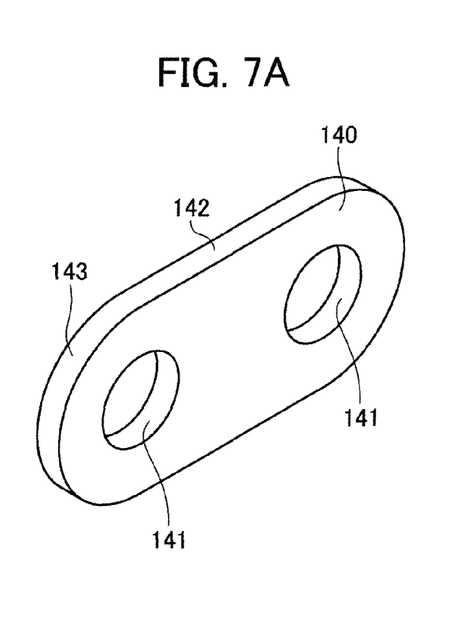
FIG. 7A is a perspective view of the outer link plate.
Figure 7B:
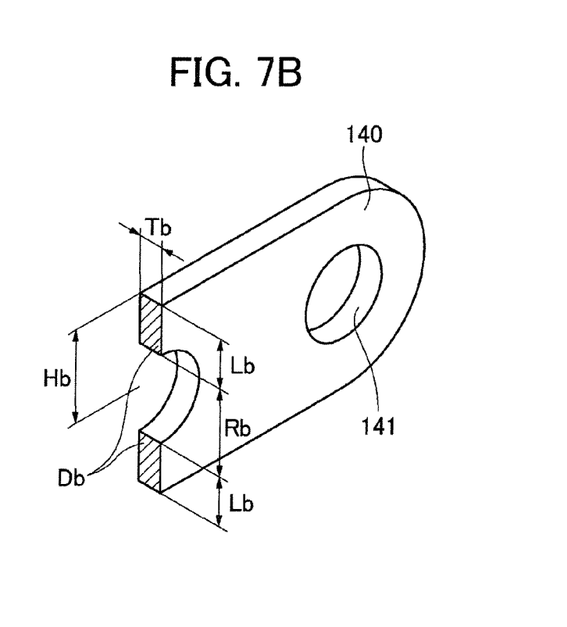
FIG. 7B is a perspective view of the inner link plate when cut by section plane 7B-7B in FIG. 6.
Figure 8A:
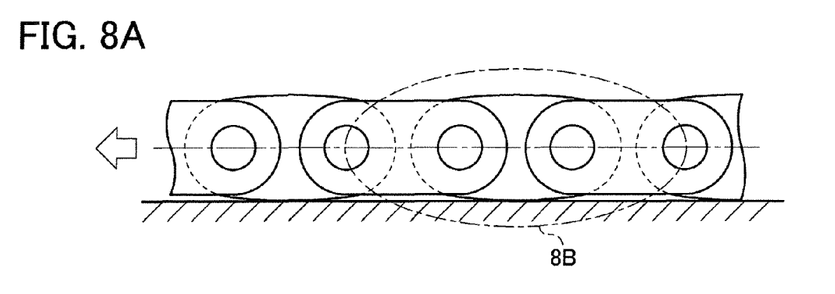
FIG. 8A is a schematic side elevational view illustrating the relationship of the chain according to the invention to a chain guide.
Figure 8B:
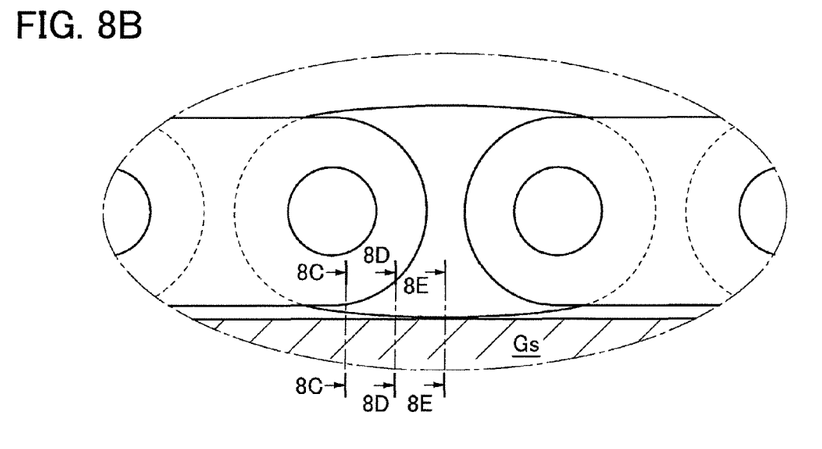
FIG. 8B is an enlarged view of a part of FIG. 8A defined by an oval-shaped broke line.
Figure 8C:
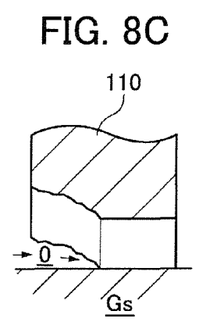
FIGS. 8C, 8D and 8D are enlarged sectional views of parts 8C, 8D and 8E defined by broken line circles in FIG. 8B.
Figure 8D:
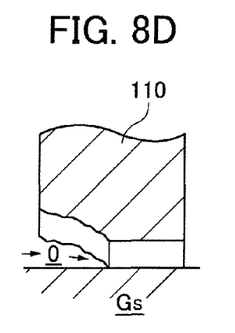
Figure 8E:
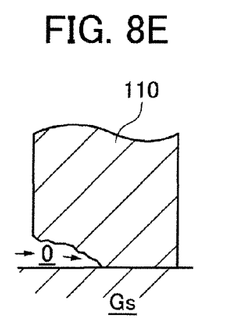

The thickness Tb of the outer link plate 140, as shown in FIG. 7B, is less than the thickness Ta of the inner link plate 110 as shown in FIG. 5B. As a result, the outer link plate 140 is less rigid than the inner link plate 110 so that the outer link plates elastically deform in response to tension exerted on the inner link plates, and the inner and outer link plates are maintained in parallel relationship. Accordingly, it is possible to avoid breakage of the connecting pin caused by bending, and to reduce wear of the connecting pins and the bushings by assuring a sufficient contact area between the pin and the bushings.

The following dimensions are the relevant dimensions of the inner link 110 and the outer link plate 140.

Ha is the back height of inner link plate.
Hb is the back height of outer link plate.
Ra is the diameter of bushing hole.
Rb is the diameter of pin hole.
Ta is the thickness of inner link plate.
Tb is the thickness of outer link plate.
La is the distance from the bushing hole to the guide-contacting surface of the inner link plate, measured in a plane perpendicular to the longitudinal direction of the chain and in which the axis of the bushing hole lies.
Lb is the distance from the pin hole to the outer surface of the inner link plate, measured in a plane perpendicular to the longitudinal direction of the chain and in which the axis of the pin hole lies.

The cross sectional area Da of the inner link plate 110 in a plane perpendicular to the longitudinal direction of the chain and in which the axis of the bushing hole lies is given by $$Da=2La\,Ta=2(Ha-Ra/2)Ta$$

The cross sectional area Db of the outer link plate 140 in a plane perpendicular to the longitudinal direction of the chain and in which the axis of the pin hole lies is given by $$Db=2Lb\,Tb=2(Hb-Rb/2)Tb$$

The cross-sectional area Db is larger than the cross-sectional area Da. As a result, the rupture strength of the outer link plate 140 is greater than the rupture strength of the inner link plate 110.

The plate height 2Ha of the inner link plate 110 is less that the chain pitch P. Therefore, it is possible for the chain to be compatible in layout and disposition with the prior art roller chains in which the plate height is less than the chain pitch P. Therefore, it is possible to replace a conventional timing chain with a chain according to the invention without modifying the tensioner lever, the tensioner, the sprockets, or other components of the timing drive.

With the distance between points 112a longer than the chain pitch but shorter than the diameter Po of the imaginary circumscribed circle including and tangent to the bushing holes and centered on a line intersecting the centers the bushing holes, even if the surface shown in FIGS. 8A through 8E is curved, arc-shaped edge 112 of the inner link plate comes into sliding contact with the chain guide G before the outer link plate 140 can contact the guide, and prevents the straight parts of the outer link plates 140 from contacting the chain guide. Therefore, it is possible to reduce frictional resistance by reducing the overall contact area between the chain and the chain guide G.

Figure 9:
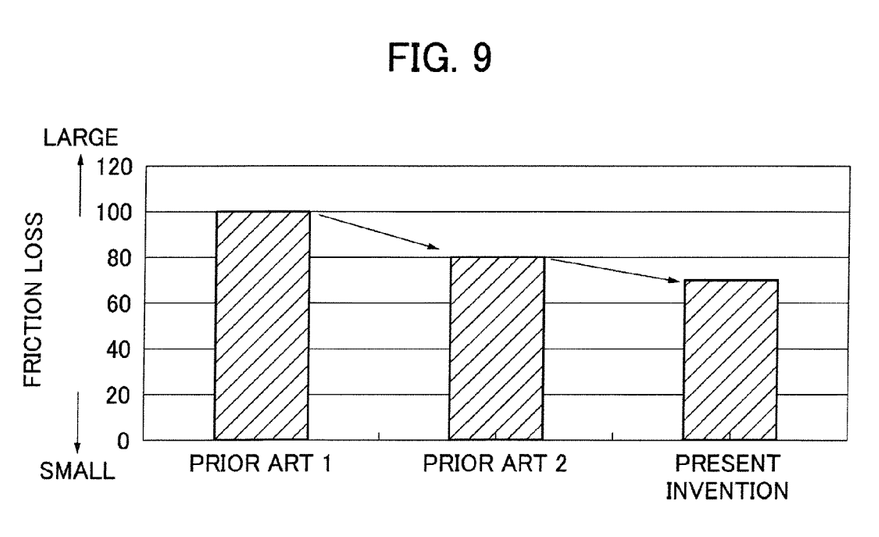
FIG. 9 is a graph comparing frictional losses in prior art transmission chains and a transmission chain according to the invention.

The relationship between the shapes of the inner and outer link plates also improves the flow of lubricating oil through the gap between the outer link plate 140 and the chain guide, and improves efficiency by reducing frictional losses. FIG. 9 compares a "Prior Art 1" transmission chain in which the inner and outer link plates have the same oval plate shape, a "Prior Art 2," transmission chain in which both the inner and outer link plates have an oval shape and in which the inner link plates have a back height, at least on the guide-contacting side, that is slightly greater than that of the outer link plates, with a transmission chain in accordance with the invention. For comparison, the frictional loss of the "Prior art 1" chain is evaluated at a level of 100.

Figure 11A:
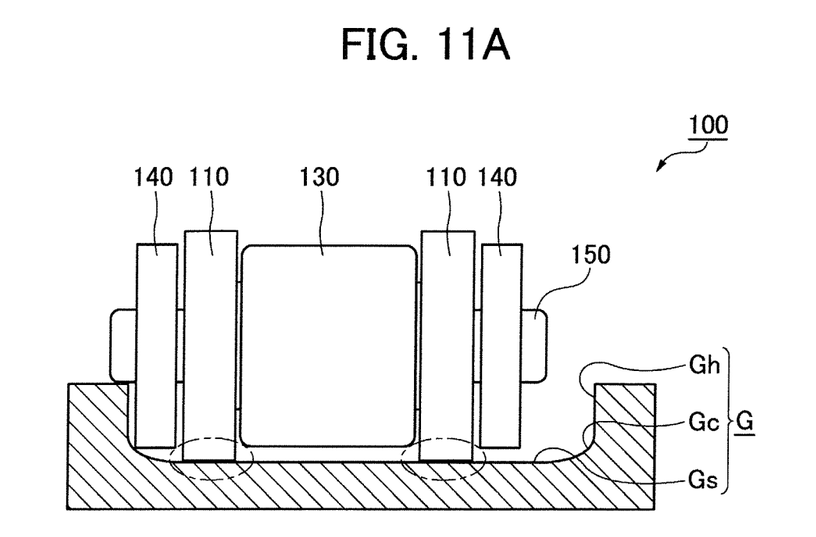
FIG. 11A is transverse cross-sectional view showing the chain according to the invention traveling on a chain guide.
Figure 11B:
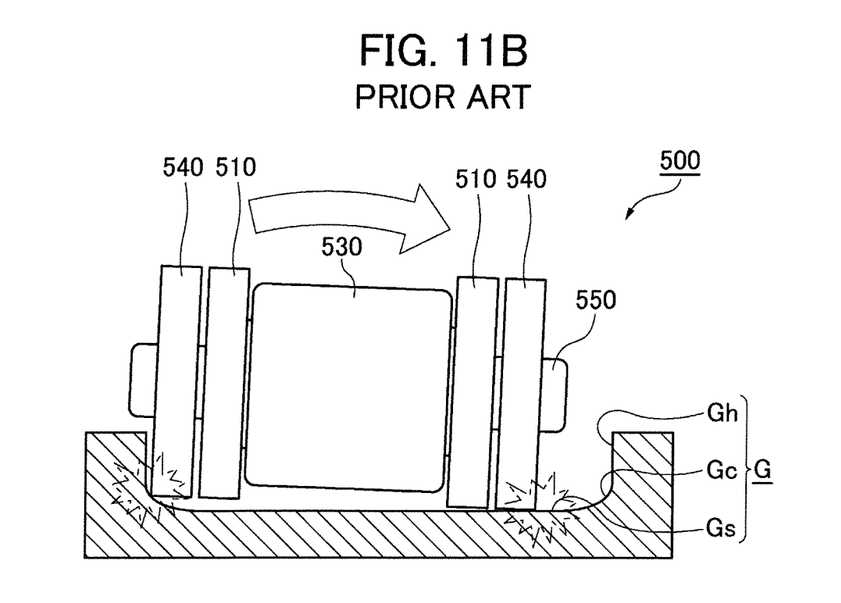
FIG. 11B is a transverse cross-sectional view showing a conventional chain traveling on a chain guide.

It is possible to assure stable chain travel by avoiding the inclined condition caused when the outer link plate 140 rides on the corner portion Gc of the guide, as shown in FIG. 11B. In FIG. 11A because the back height of the outer links is less than the back height of the inner links, the inclined condition is less likely to occur, and wear of the outer link plates and the guide can be reduced by avoiding load concentration caused by the local contact of the outer edges of the outer link plates 140 with the guide.

Figure 10A:
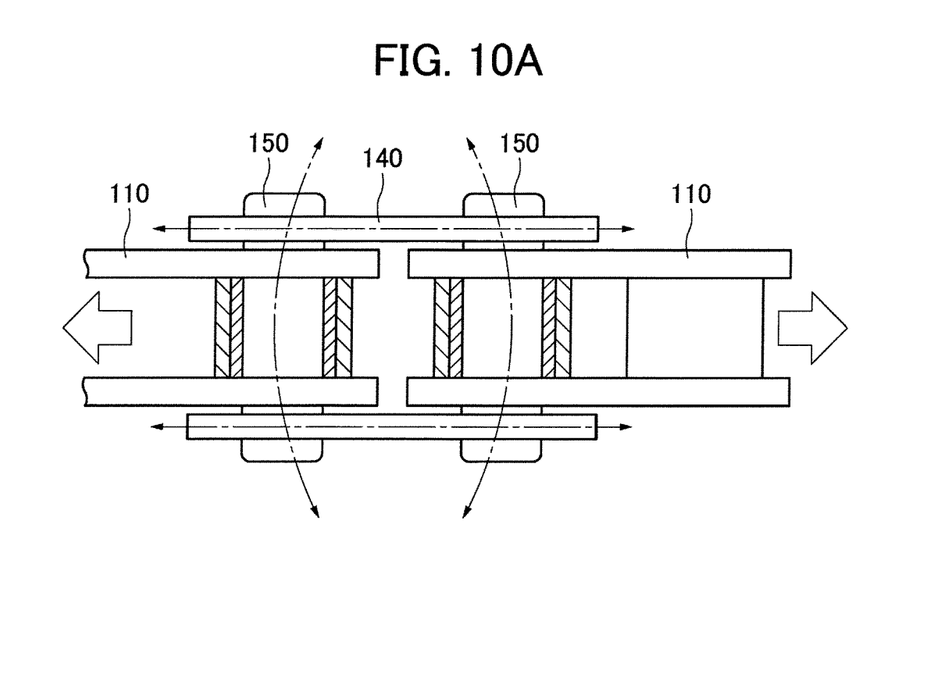
FIG. 10A is a plan view illustrating the chain of the invention under tension.
Figure 10B:
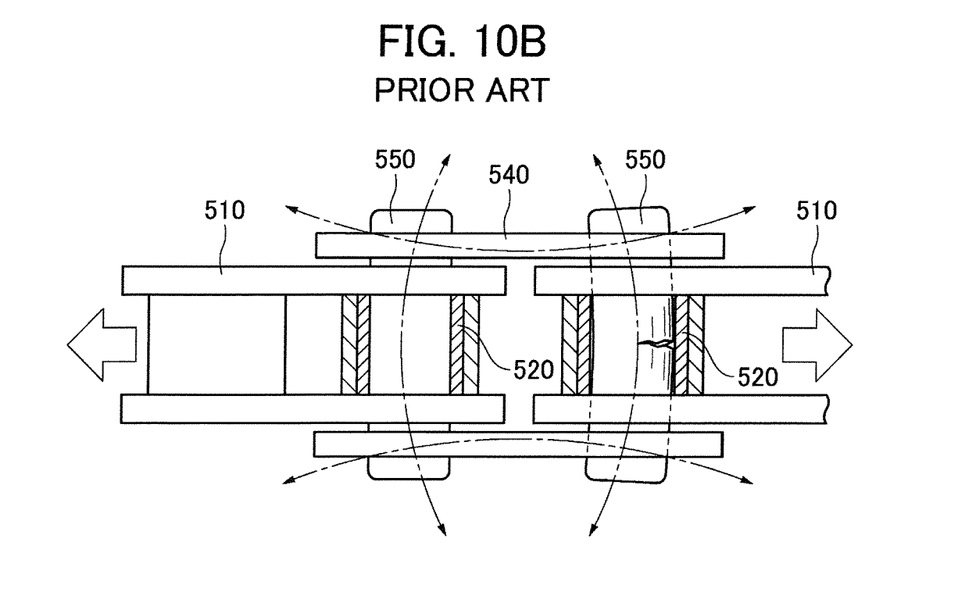
FIG. 10B illustrates a conventional chain under tension.

FIG. 10B shows how a connecting pin 550 can be broken by bending in a prior art power transmission chain 500 having inner link plates 510, outer link plates 550, and bushings 520. In FIG. 10A, the greater elastic deformation of the outer link plates in the direction of elongation of the chain prevents the breakage of the connecting pins. The arrows in FIGS. 10A and 10B show the loads on the link plates when the chain is under tension.

As will be apparent from FIGS. 10A-11B, it is possible to suppress wear of the connecting pins and the bushings, and to suppress breakage of the connecting pins caused by bending. It is also possible to maintain the rupture strength of the chain even while the rigidity of the outer link plate 140 is lower than rigidity of the inner link plate 110.

The power transmission chain according to the invention reduces the contact area between the chain and the chain guide, permits the lubricating oil to flow more readily through a gap between the outer link plate and the chain guide, reduces frictional loss, prevents breakage of the connecting pin, assures stable chain travel, and suppresses the wear of the chain guide.

The advantages of the invention can be realized both in a roller chain, in a rollerless bushing chain, and in other kinds of chains such as double-train roller chains in which two roller chains are arranged in side-by-side relationship.

The arc-shaped guide-contacting edge of the inner link plates may be defined by a plurality of arc-shaped curves or by involute curves.

What is claimed is:

1. A power transmission chain for sliding contact with a chain guide, the chain having a longitudinal direction and a lateral direction and comprising:
   pairs of laterally spaced inner link plates, with cylindrical bushings having ends press-fit into bushing holes in the inner link plates; and
   pairs of laterally spaced outer link plates, with connecting pins press-fit into pin holes in the outer link plates, the pairs of outer link plates being in alternating, overlapping relationship with the pairs of inner link plates along the length of the chain, each connecting pin of a pair of outer link plates extending rotatably through a bushing of an overlapping pair of inner link plates whereby the pairs of link plates are articulably connected;
   wherein each inner link plate has an oval profile, including a continuously convex, arc-shaped, edge for sliding contact with the surface of a guide, said arc-shaped edge having opposite ends spaced from each other along a direction parallel to the longitudinal direction of the chain, said opposite ends being located, with reference to the longitudinal direction of the chain, respectively forward relative to the center of a foremost bushing hole of said inner link plate, and rearward relative to the center of a rearmost bushing hole of said inner link;
   wherein the distance from one of said opposite ends of the arc-shaped edge of each inner link plate to the other end thereof is greater than the pitch of the chain but less than the diameter of an imaginary circle circumscribing and tangent to both of the bushing holes of said inner link plate and centered on a center line intersecting the centers of said bushing holes; and
   wherein the thickness of the outer link plate is less than the thickness of the inner link plate, but the cross-sectional area of each section of the outer link plate, in a plane perpendicular to the longitudinal direction of the chain and in which the axis of one of said connecting pins lies, is greater than the cross-sectional area of each section of the inner link plate, in a plane perpendicular to the longitudinal direction of the chain and in which the axis of one of said bushings lies.

2. The power transmission chain according to claim 1, wherein:
   each of said outer link plates has an oval profile and an edge composed of straight parts on opposite sides of, and parallel to, a centerline intersecting the centers of the pin holes, each of said straight parts having a first end opposed to a first end of the other straight part and a second end opposed to a second end of the other straight part, a first curved connecting part continuous with the straight parts and connecting said first ends, and a second curved connecting part continuous with the straight part and connecting said second ends; and
   the back height of the outer link plate is less than the back height of the inner link plate whereby only the inner link plate can come into sliding contact with a chain guide.

3. The power transmission chain according to claim 1, wherein the height of each inner link plate is less than the chain pitch.

4. The power transmission chain according to claim 1, including a roller fitting around each of said bushings and rotatable thereon.

5. The power transmission chain according to claim 4, wherein:
   each of said outer link plates has an oval profile and an edge composed of straight parts on opposite sides of, and parallel to a centerline intersecting the centers of the pin holes, each of said straight parts having a first end opposed to a first end of the other straight part and a second end opposed to a second end of the other straight part, and a first curved connecting part continuous with the straight parts and connecting said first ends and a second curved connecting part continuous with the straight part and connecting said second ends; and
   wherein the back height of the outer link plate is less than the back height of the inner link plate whereby only the inner link plate can come into sliding contact with a chain guide.

* * * * *